United States Patent
de Queiroz et al.

(10) Patent No.: US 11,235,854 B2
(45) Date of Patent: Feb. 1, 2022

(54) SHUTTER DOOR MECHANISM FOR WING LEADING EDGE SLAT CUT-OUTS

(71) Applicant: EMBRAER S.A., São José dos Campos (BR)

(72) Inventors: Andre Ganam de Queiroz, São José dos Campos (BR); Alexandre Takao Motoyama, São José dos Campos (BR); Azelio Pasquini, São José dos Campos (BR); Douglas Carrari Firming, São José dos Campos (BR); Egon dos Santos Borges, São José dos Campos (BR); Henrique Fonseca de Araujo, São José dos Campos (BR); Luiz Flavio Fernandes, São José dos Campos (BR); Nilson Luiz David, São José dos Campos (BR)

(73) Assignee: YABORÄ INDÚSTRIA AERONÁUTICA S.A., São José Dos Campos (BR)

(*) Notice: Subject to any disclaimer, the term of this patent is extended or adjusted under 35 U.S.C. 154(b) by 118 days.

(21) Appl. No.: 16/823,837

(22) Filed: Mar. 19, 2020

(65) Prior Publication Data
US 2020/0307760 A1    Oct. 1, 2020

Related U.S. Application Data

(60) Provisional application No. 62/827,331, filed on Apr. 1, 2019.

(51) Int. Cl.
*B64C 3/50* (2006.01)
*B64C 9/22* (2006.01)
*B64C 9/34* (2006.01)
*B64C 9/02* (2006.01)
*B64C 9/14* (2006.01)

(52) U.S. Cl.
CPC ............ *B64C 3/50* (2013.01); *B64C 9/02* (2013.01); *B64C 9/22* (2013.01); *B64C 9/34* (2013.01); *B64C 2009/143* (2013.01)

(58) Field of Classification Search
CPC .... B64C 3/50; B64C 9/22; B64C 9/34; B64C 9/02; B64C 2009/143; B64C 9/24
See application file for complete search history.

(56) References Cited

U.S. PATENT DOCUMENTS

| | | | | | |
|---|---|---|---|---|---|
| 1,818,000 | A | * | 8/1931 | Moles | B64C 9/24 244/203 |
| 3,486,720 | A | * | 12/1969 | Seglem | B64C 9/24 244/210 |
| 4,585,192 | A | * | 4/1986 | Clifford-Jones | B64C 3/50 244/214 |
| 4,615,499 | A | * | 10/1986 | Knowler | B64D 15/04 244/134 B |
| 5,044,580 | A | * | 9/1991 | Williams | B64C 9/22 244/214 |
| 6,015,117 | A | * | 1/2000 | Broadbent | B64C 9/22 244/214 |

(Continued)

*Primary Examiner* — Assres H Woldemaryam
(74) *Attorney, Agent, or Firm* — Nixon & Vanderhye P.C.

(57) ABSTRACT

An aircraft wing is provided with a shutter mechanism to close a cut-out opening in the leading edge of the wing when a leading edge wing slat associated with the wing leading edge is moved to a deployed condition.

14 Claims, 6 Drawing Sheets

(56) References Cited

U.S. PATENT DOCUMENTS

| | | | | |
|---|---|---|---|---|
| 7,322,547 | B2 * | 1/2008 | Konings | B64C 9/26 244/214 |
| 8,708,280 | B2 * | 4/2014 | Blanchard | H02G 11/006 244/131 |
| 10,919,616 | B2 * | 2/2021 | Vervliet | B64C 9/22 |
| 2001/0038058 | A1 * | 11/2001 | Gleine | B64C 3/46 244/198 |
| 2002/0109048 | A1 * | 8/2002 | Bliesner | B64C 9/22 244/214 |
| 2013/0214096 | A1 * | 8/2013 | Wilson | B64C 3/50 244/213 |

\* cited by examiner

SHUTTER DOOR MECHANISM FOR WING LEADING EDGE SLAT CUT-OUTS

CROSS-REFERENCE TO RELATED APPLICATION

This application is based on and claims domestic priority benefits of U.S. Provisional Application Ser. No. 62/827,331 filed on Apr. 1, 2019, the entire contents of each of which are expressly incorporated hereinto by reference.

FIELD

The embodiments disclosed herein relate generally to aircraft wings having wing leading edge slats. More specifically, the embodiments disclosed herein relate to shutter mechanisms whereby a cut-out opening in the wing leading edge skin associated with a slat track of a leading edge slat is substantially covered when the leading edge slat is deployed.

BACKGROUND

The wing leading edge slat is a movable high-lift aerodynamic surface located forward of the wing leading edge. Most modern transport category aircraft can include, for example, between eight and twelve slat panels that are deployed when needed (e.g., during landing and take-off operations) to increase lift of the wings. It is common to use movable arcuate slat tracks attached to the individual slat panels as a mechanism to extend the slat panels between their retracted and deployed conditions relative to the wing leading edge, with each slat panel moving around an artificial axis located at the center of the slat track radius. The actuation of the slat tracks is typically accomplished by a gear coupling between the track and a pinion on each track station which is driven by torque tubes connected to an electric motor located in the aircraft's fuselage. Each slat track is typically supported by two pairs of lateral rollers located in the inboard and outboard leading edge rib to absorb the lateral loads and to smoothly guide the slat track during movement.

It can be appreciated that when the leading edge wing slat is deployed, it will expose a cut-out opening in the wing leading edge skin to the oncoming incident airflow thereby potentially impacting aerodynamic performance of the slat and/or wing. It would therefore be highly desirable if the cut-out opening could be covered substantially by a shutter mechanism when the leading wing edge slat is deployed so as to minimize (if not alleviate entirely) adverse aerodynamic performance impacts. It is towards providing such solutions that the embodiments disclosed herein are directed.

SUMMARY

Generally, the embodiments disclosed herein are directed toward a shutter mechanism whereby the cut-out opening in the wing leading edge skin associated with the slat track associated with a leading edge slat is substantially covered when the leading edge slat is deployed.

According to some embodiments disclosed herein, an aircraft wing having a wing leading edge is provided with a cut-out and a shutter mechanism to close the cut-out opening when the wing leading edge slat is moved from a retracted condition to a deployed condition thereof. The shutter mechanism may include a shutter door sized and configured to substantially close the cut-out opening when moved from a retracted position to an extended position thereof, a linkage assembly comprising a support shaft and having an upper end pivotally connected to the shutter door and a lower end connected to the support shaft for rotational movements about a pivot axis defined by the support shaft, and a torsion spring assembly operatively connected to the support shaft and exerting a bias force on the linkage assembly in a direction to move the shutter door from the retracted position thereof and into the extended position thereof.

The linkage assembly may include multiple link bars operatively interconnected to one another. Some embodiments will include multiple link bars having a drive link bar fixed at one end to the support shaft so as to be rotatable about the pivot axis thereof and an opposite end pivotally connected at a forward connection point of the shutter door. The multiple link bars may include first and second link bars each having upper and lower ends, wherein the upper end of the first link bar and the lower end of the second link bar are rigidly fixed to one another, the lower end of the first link bar is pivotally connected to the wing leading edge, and the upper end of the second link bar is pivotally connected to an aft connection point of the shutter door.

According to certain embodiments, the shutter mechanism may comprise a spaced-apart pair of linkage assemblies, whereby each linkage assembly includes multiple link bars operatively interconnected to a respective side of the shutter door and having oppositely oriented support shafts. Each such linkage assembly may therefore also include an upper end pivotally connected to a respective side of the shutter door and a lower end connected to a respective support shaft for rotational movements about a pivot axis defined by the support shaft, a pair of oppositely oriented torsion spring assemblies operatively connected to the respective support shaft and exerting a bias force on a respective one of the linkage assemblies in a direction to move the shutter door from the retracted position thereof and into the extended position thereof.

According to other embodiments, the shutter mechanism may include a pair of spaced-apart sliding trail guides positionally fixed to the wing leading edge; and a pair of oppositely oriented outwardly protruding slide pins carried by the shutter door and slideably engaged with a respective one of the trail guides.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 5B:
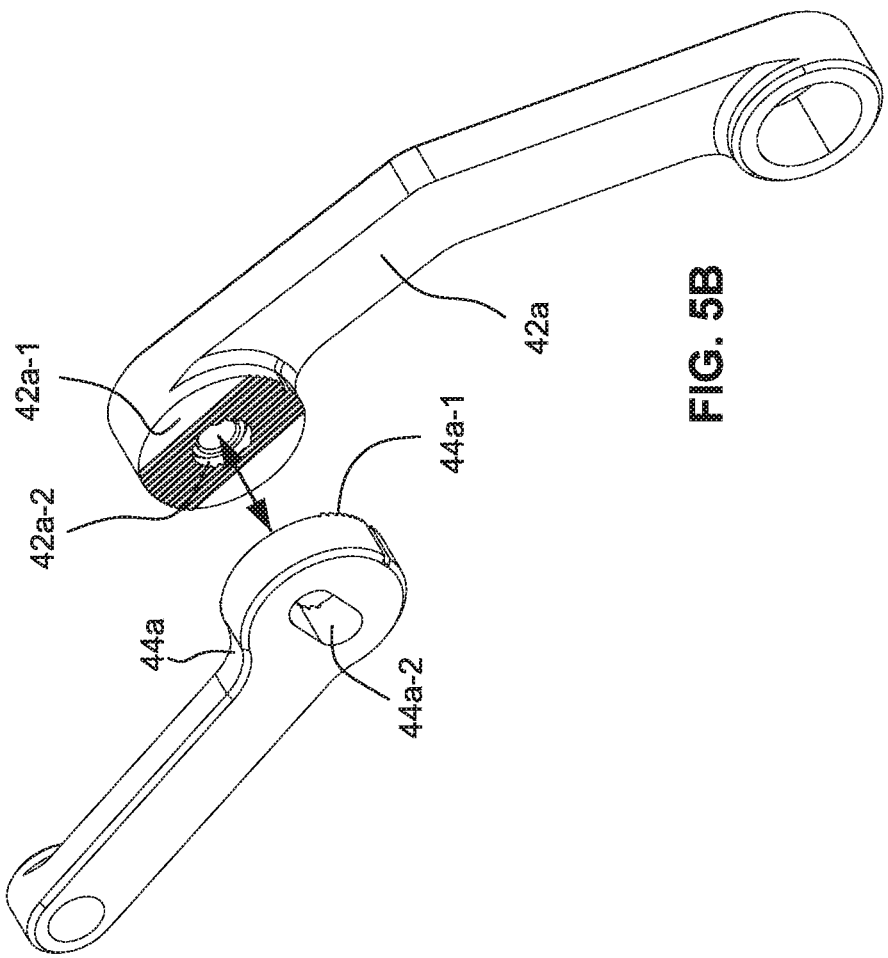
Figure 5A:
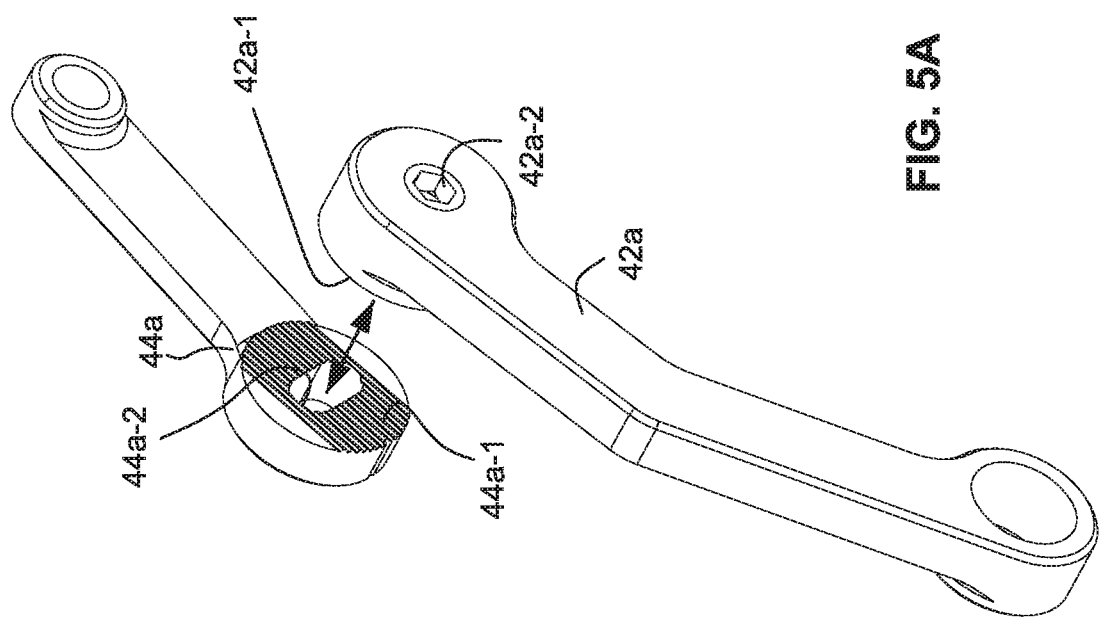
Figure 6:
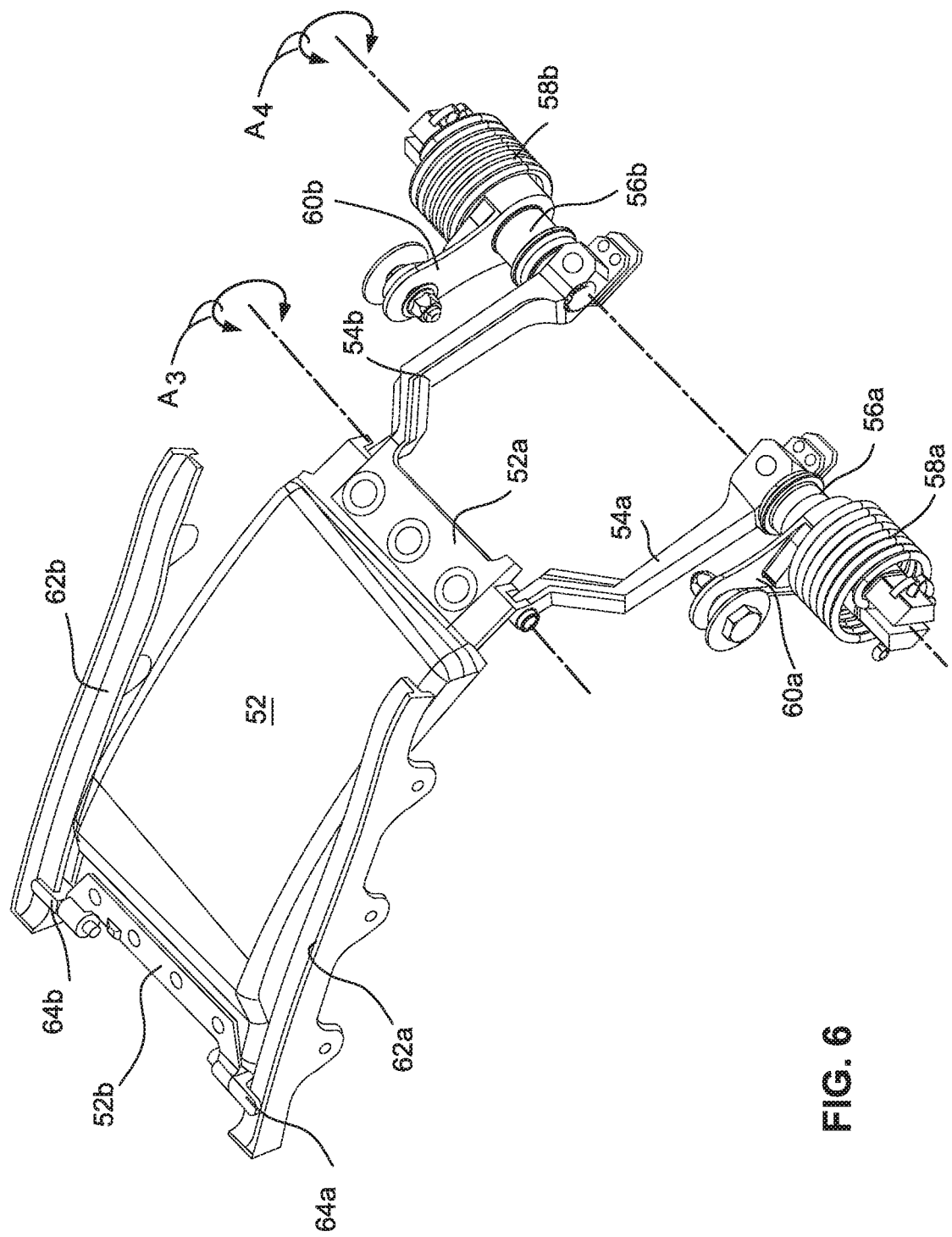

FIGS. 5A and 5B are enlarged left and right perspective views of a pair of exemplary link bar connections that may be employed in the shutter mechanism of the invention; and FIG. 6 is an enlarged perspective view of another embodiment of a shutter mechanism that may be employed in a wing leading edge so as to cover the slat track opening therein when the leading edge slat is in the deployed condition.

DETAILED DESCRIPTION OF EMBODIMENTS

Figure 1:
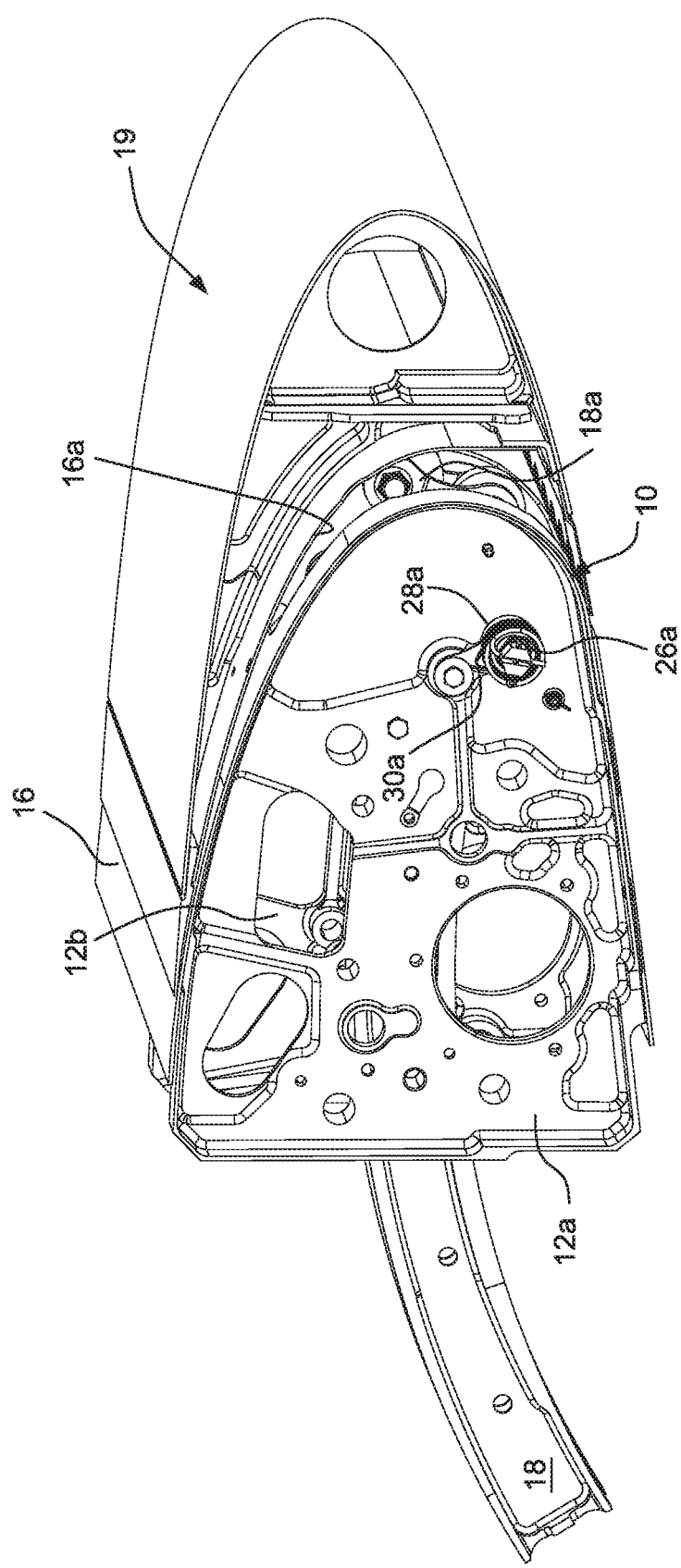
FIGS. 1 and 2 are side perspective views, partly sectioned, of an aircraft wing leading edge and associated leading edge slat depicting an embodiment of the shutter mechanism associated with the wing leading edge cut-out with the wing slat in retracted and deployed conditions, respectively.
Figure 2:
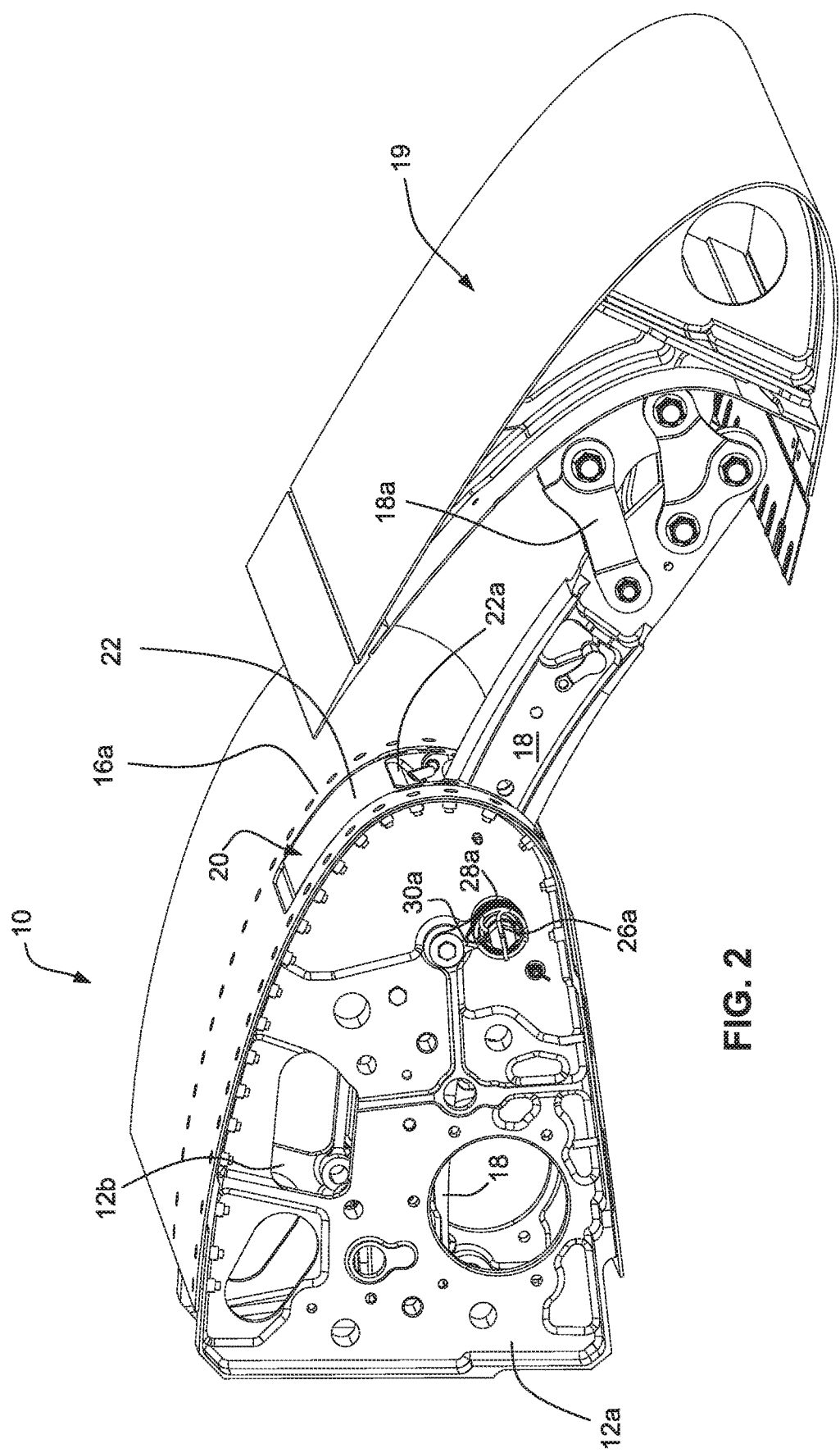

Accompanying FIGS. 1-2 depict a wing leading edge 10 that is provided with an inboard and outboard ribs 12a, 12b which are attached to and extend outwardly from a wing stringer (not shown). As is conventional, the leading edge 10 includes a skin 16 which is provided with a slat track cut-out opening 16a to allow movement of an arcuate slat track 18 operably associated with the leading edge 10 between retracted and extended positions thereof (i.e., so as to move a wing leading edge slat 19 between its retracted and deployed conditions, respectively, relative to the leading edge 10). The leading edge 10 is provided with a shutter mechanism 20 (see FIG. 3) provided with a shutter door 22 having the same curvature as the leading edge skin 16 at the cut-out opening 16a that is moveable into a position which substantially covers the cut-out opening 16a when the leading edge wing slat 19 is moved into the deployed condition thereof as shown in FIG. 2.

Figure 3:
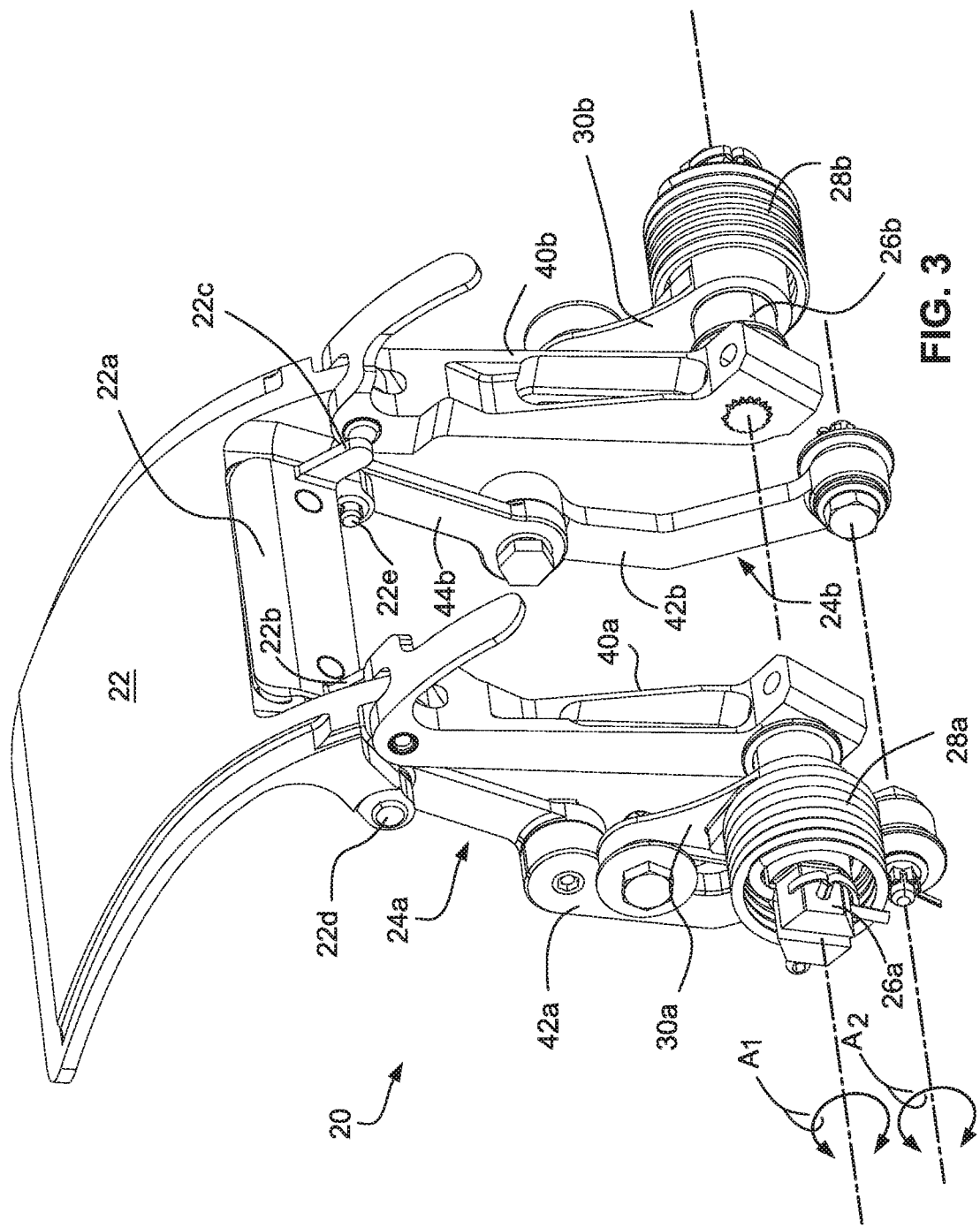
FIG. 3 is an enlarged perspective view of the shutter mechanism employed in the wing leading edge shown in FIG. 1.
Figure 4B:
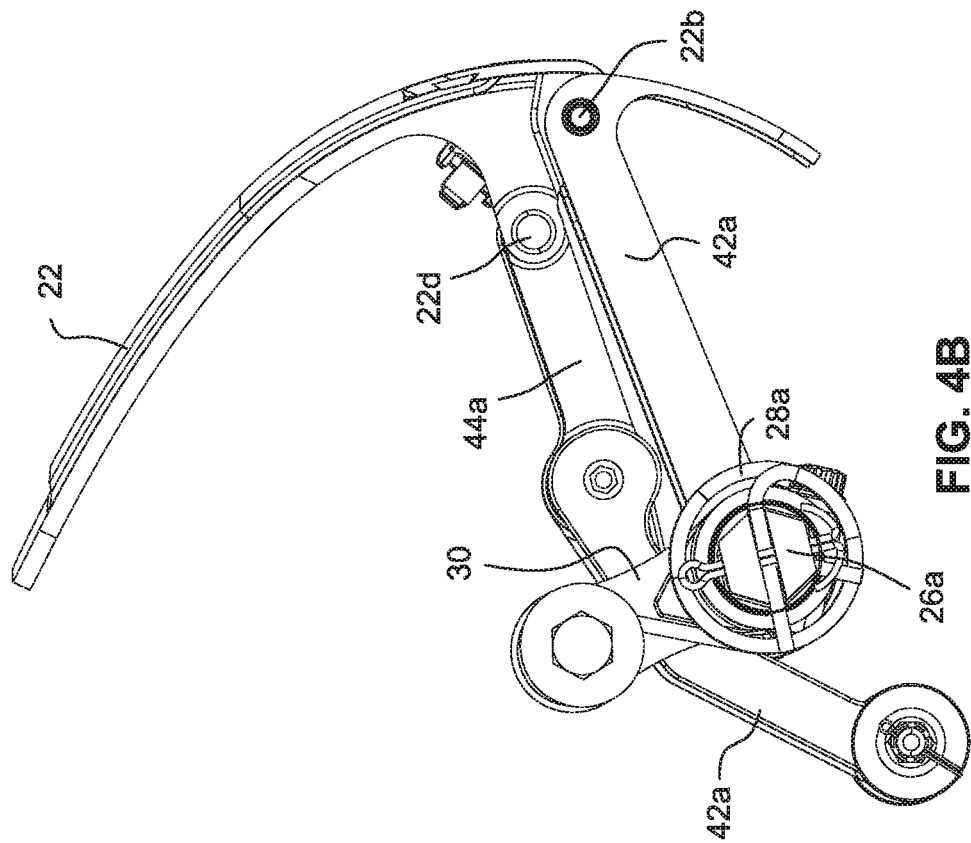
FIGS. 4A and 4B are side elevational views of the shutter mechanism shown in FIG. 3 in retracted and extended positions, respectively.
Figure 4A:
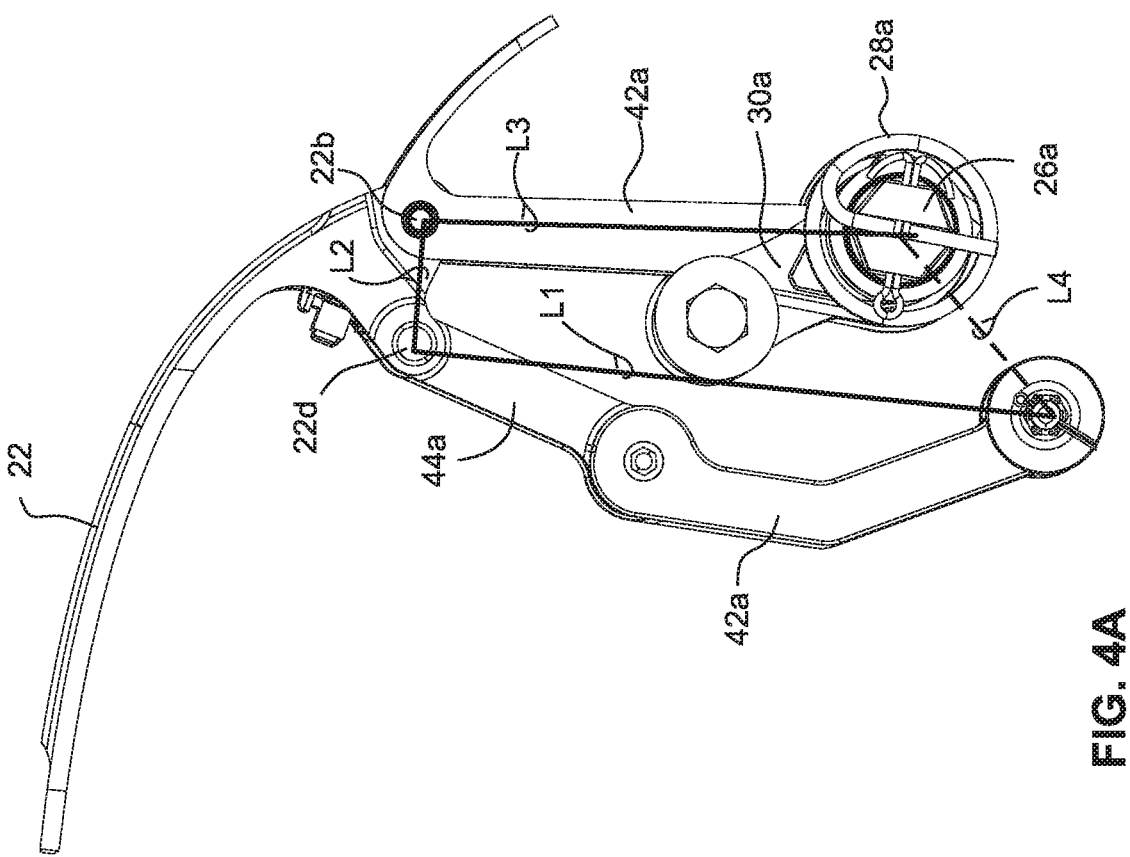

As is perhaps best shown in FIGS. 3 and 4A-4B, the shutter mechanism 20 in accordance with an embodiment of this invention includes laterally separated opposed linkage bar assemblies 24a, 24b. As shown the linkage bar assemblies 24a, 24b operatively interconnect the shutter door 22 to a respective splined support shaft 26a, 26b. A torsion spring 28a, 28b operatively interconnects the support shafts 26a, 26b to a fixed link 30a, 30b, respectively.

The torsion springs 28a, 28b thereby apply a bias force to the support shafts 26a, 26b in a direction tending to move the shutter door into the extended position so as to substantially cover the cut-out opening 16a. In the position depicted in FIG. 3, therefore, the torsion springs 28a, 28b are loaded with spring force to move the shutter door 22 in a clockwise direction (as viewed from the left-hand side of FIG. 3) about the common axis A1 of the shafts 26a, 26b but are prevented from such movement when in the retracted position due to engagement of the slat track link 18a associated with the slat track 18 and the forward contact surface 22a of the shutter door 22. Thus, as the wing leading edge slat 19 retracts from its deployed condition as shown in FIG. 2 to its retracted condition as shown in FIG. 1, the slat track link 18a will engage the contact surface 22a of the shutter door 22 thereby responsively causing the support shafts 26a, 26b to rotate and thereby load the respective torsion spring 28a, 28b with spring force for the next operational cycle.

Each of the linkage bar assemblies 24a, 24b is provided with a drive link 40a, 40b pivotally connected at one end so as to pivot about the axis A1 of the shafts 26a, 26b and at an opposite end to a forward pivot connection 22b, 22c of the shutter door 22, respectively. A pair of first and second link bars 42a and 44a on the one hand and 42b and 44b on the other hand of the linkage arm assemblies 24a, 24b, respectively, are rigidly fixed to one another (e.g., via a suitable nut and bolt assembly, not shown) at the upper ends of the former and the lower ends of the latter. The lower ends of the link bars 42a, 42b are pivotally connected to the wing ribs 12a, 12b, respectively, for pivotal movements about a common pivot axis A2, while the upper ends of the link bars 44a, 44b are pivotally connected to an aft pivot connection 22d and 22e, respectively of the shutter door 22.

FIGS. 4A and 4B show the linkage bar assembly 24a in retracted and extended positions, respectively. The discussion below is therefore equally applicable to the linkage bar assembly 24b and, as such, comparable structural elements associated with the latter are noted parenthetically with references to structures associated with the former. As shown, the linkage bar assembly 24a essentially establishes a four-bar mechanical linkage system having a first link L1 between the pivotal lower end of the linkage bar 42a (42b) about axis A2 and the upper end of the linkage bar 44a (44b) where it is pivotally connected to the aft pivot connection 22d (22e) of the shutter door 22. A second link L2 is established between the pivotal connection of the upper end of the linkage bar 44a (44b) and the aft pivot connection 22d (22e) of the shutter door 22 and the pivotal connection of the upper end of the drive link bar 40a (40b) and the forward pivot connection 22b (22c) of the shutter door 22. A third link L3 is established between the pivotal connection of the upper end of the linkage bar 44a (44b) and the aft pivot connection 22d (22e) of the shutter door 22 and the pivotal connection between the lower end of the drive link bar 40a (40b) and the pivot connection establishing the pivot axis A1 of shaft 26. Finally an imaginary fourth link L4 is established between the pivotal lower end of the linkage bar 42a (42b) and the pivot connection establishing the pivot axis A1 of shaft 26.

The opposed internal faces 42a-1, 44a-1 of the rigidly connected linkage bars 42a and 44a at the connected upper and lower ends thereof, respectively, are shown in greater detail in FIGS. 5A and 5B. As shown, the faces 42a-1 and 44a-1 are serrated with the lower end of the linkage bar 44a having a connection aperture 44a-2 which is elongated as compared to the connection aperture 42a-2 of the upper end of the linkage bar 42a. This arrangement allows the upper and lower ends of the linkage bars 42a, 44a to be shifted somewhat (e.g., as shown by the arrows in FIGS. 5A and 5B) for purposes of adjustment during installation. Once the ends of the linkage bars 42a, 44a have adjustably positioned, a conventional nut and bolt assembly (not shown) can be inserted through the aligned apertures 42a-2, 44-2 so as to positionally lock the ends 42a-1, 44a-1 one to another.

Another embodiment of a shutter mechanism 50 in accordance with the invention is shown in FIG. 6. As shown, the shutter mechanism 50 in accordance with the embodiment of FIG. 6 includes laterally separated opposed linkage arms 54a, 54b having one (upper) end connected to a forward engagement bar 52a at the leading end of the shutter door 52 so as to allow pivotal movement therebetween about pivot axis A3. An opposite (lower) end of the linkage arms 54a, 54b is fixedly connected to a respective splined support shaft 56a, 56b. A torsion spring 58a, 58b operatively interconnects the support shafts 56a, 56b to a fixed link 60a, 60b, respectively, in a manner similar to the embodiment described above. A laterally spaced apart pair of sliding trail guides 62a, 62b is positionally fixed to the ribs 12a, 12b (not shown in FIG. 6 but see FIGS. 1 and 2). The trailing end of the shutter door 52 includes a rear engagement bar 52b which carries a pair of laterally outwardly protruding slide pins 64a, 64b cooperatively and slidingly engaged with a respective one of the guides 62a, 62b.

In a manner similar to the embodiment described previously, the torsion springs 58a, 58b apply a bias force to the linkage arms 54a, 54b so as to cause the arms 54a, 54b to rotate about the pivot axis A4 defined by the shafts 56a, 56b in a direction tending to move the shutter door 53 into the extended position so as to substantially cover the cut-out opening 16a. In the retracted position as depicted in FIG. 6, therefore, the torsion springs 58a, 58b are loaded with spring force to move the shutter door 52 in a clockwise direction (as viewed from the left-hand side of FIG. 6) about the common pivot axis A4 of the shafts 56a, 56b. The shutter door 52 is however prevented from such movement when in the retracted position due to engagement of the forward engagement bar 52a with the slat track link associated with the slat track. Upon movement of the wing leading edge slat 19 from its retracted position and into the deployed condition, thereof, the spring force of the torsion springs 58a, 58b will unload causing the shutter door 52 to follow the movement of the leading edge slat track until such time as the cut-out opening in the wing leading edge is closed thereby. However, as the wing leading edge slat 19 retracts from its deployed condition to its retracted condition, the slat track link 18a will engage the contact bar 52a at leading end of the shutter door 52 thereby responsively causing the support shafts 56a, 56b to rotate in a counterclockwise direction as viewed from the left of FIG. 6 and thereby once again loading the respective torsion spring 58a, 58b with spring force for the next operational cycle. During such movements, the trailing end of the shutter door 52 is guided along the trail guides 62a, 62b by virtue of the sliding contact of the guide pins 64a, 64b, respectively.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An aircraft wing comprising:
   a wing leading edge;
   a cut-out opening in the wing leading edge; and
   a shutter mechanism to close the cut-out opening when a wing leading edge slat is moved from a retracted condition to a deployed condition thereof, wherein the shutter mechanism comprises:
   (i) a shutter door sized and configured to substantially close the cut-out opening when moved from a retracted position to an extended position thereof;
   (ii) a linkage assembly comprising a support shaft and having an upper end pivotally connected to the shutter door and a lower end connected to the support shaft for rotational movements about a pivot axis defined by the support shaft; and
   (iii) a torsion spring assembly operatively connected to the support shaft and exerting a bias force on the linkage assembly in a direction to move the shutter door from the retracted position thereof and into the extended position thereof.

2. The aircraft wing according to claim 1, wherein the linkage assembly includes multiple link bars operatively interconnected to one another.

3. The aircraft wing according to claim 2, wherein the multiple link bars comprise a drive link bar fixed at one end to the support shaft so as to be rotatable about the pivot axis thereof and an opposite end pivotally connected at a forward connection point of the shutter door.

4. The aircraft wing according to claim 3, wherein the multiple link bars comprise first and second link bars each having upper and lower ends, wherein (i) the upper end of the first link bar and the lower end of the second link bar are rigidly fixed to one another, (ii) the lower end of the first link bar is pivotally connected to the wing leading edge, and (iii) the upper end of the second link bar is pivotally connected to an aft connection point of the shutter door.

5. The aircraft wing according to claim 1, wherein the shutter mechanism comprises:
   a spaced-apart pair of linkage assemblies, each linkage assembly including multiple link bars operatively interconnected to a respective side of the shutter door and having oppositely oriented support shafts, and wherein each linkage assembly includes an upper end pivotally connected to a respective side of the shutter door and a lower end connected to a respective support shaft for rotational movements about a pivot axis defined by the support shaft; and
   a pair of oppositely oriented torsion spring assemblies operatively connected to the respective support shaft and exerting a bias force on a respective one of the linkage assemblies in a direction to move the shutter door from the retracted position thereof and into the extended position thereof.

6. The aircraft wing according to claim 5, wherein each of the multiple link bars comprises a drive link bar fixed at one end to the support shaft so as to be rotatable about the pivot axis thereof and an opposite end pivotally connected at a forward connection point of the shutter door at a respective side thereof.

7. The aircraft wing according to claim 6, wherein each of the multiple link bars comprise first and second link bars each having upper and lower ends, wherein (i) the upper end of the first link bar and the lower end of the second link bar are rigidly fixed to one another, (ii) the lower end of the first link bar is pivotally connected to the wing leading edge, and (iii) the upper end of the second link bar is pivotally connected to an aft connection point of the shutter door.

8. The aircraft wing according to claim 1, wherein the torsion spring assembly includes a fixed link attached to a wing rib of the wing leading edge and a torsion spring having one end fixed to the support shaft and another end fixed to the fixed link.

9. The aircraft wing according to claim 1, wherein the shutter mechanism further comprises:
   a pair of spaced-apart sliding trail guides positionally fixed to the wing leading edge; and
   a pair of oppositely oriented outwardly protruding slide pins carried by the shutter door and slideably engaged with a respective one of the trail guides.

10. The aircraft wing according to claim 9, wherein the linkage assembly comprises:
    a pair of spaced-apart link bars;
    a pair of oppositely oriented support shafts, wherein an upper end of each link bar is rotatably attached to a respective forward connection point of the shutter door and a lower end of each link bar is fixed to a respective one of the support shafts; and
    a pair of oppositely oriented torsion spring assemblies each being operatively connected to the respective one of the support shafts and exerting a bias force on the link bars in a direction to move the shutter door from the retracted position thereof and into the extended position thereof.

11. The aircraft wing according to claim 9, wherein the shutter mechanism comprises:
    a spaced-apart pair of linkage assemblies, each linkage assembly including multiple link bars operatively interconnected to a respective side of the shutter door and having oppositely oriented support shafts, and wherein each linkage assembly includes an upper end pivotally connected to a respective side of the shutter door and a lower end connected to a respective support shaft for rotational movements about a pivot axis defined by the support shaft;

a pair of oppositely oriented torsion spring assemblies operatively connected to the respective support shaft and exerting a bias force on a respective one of the linkage assemblies in a direction to move the shutter door from the retracted position thereof and into the extended position thereof.

12. The aircraft wing according to claim 11, wherein each of the torsion spring assemblies includes a fixed link attached to a wing rib of the wing leading edge and a torsion spring having one end fixed to the support shaft and another end fixed to the fixed link.

13. An aircraft which comprises the aircraft wing according to claim 1.

14. An aircraft which comprises the aircraft wing according to claim 10.

\* \* \* \* \*